UNITED STATES PATENT OFFICE.

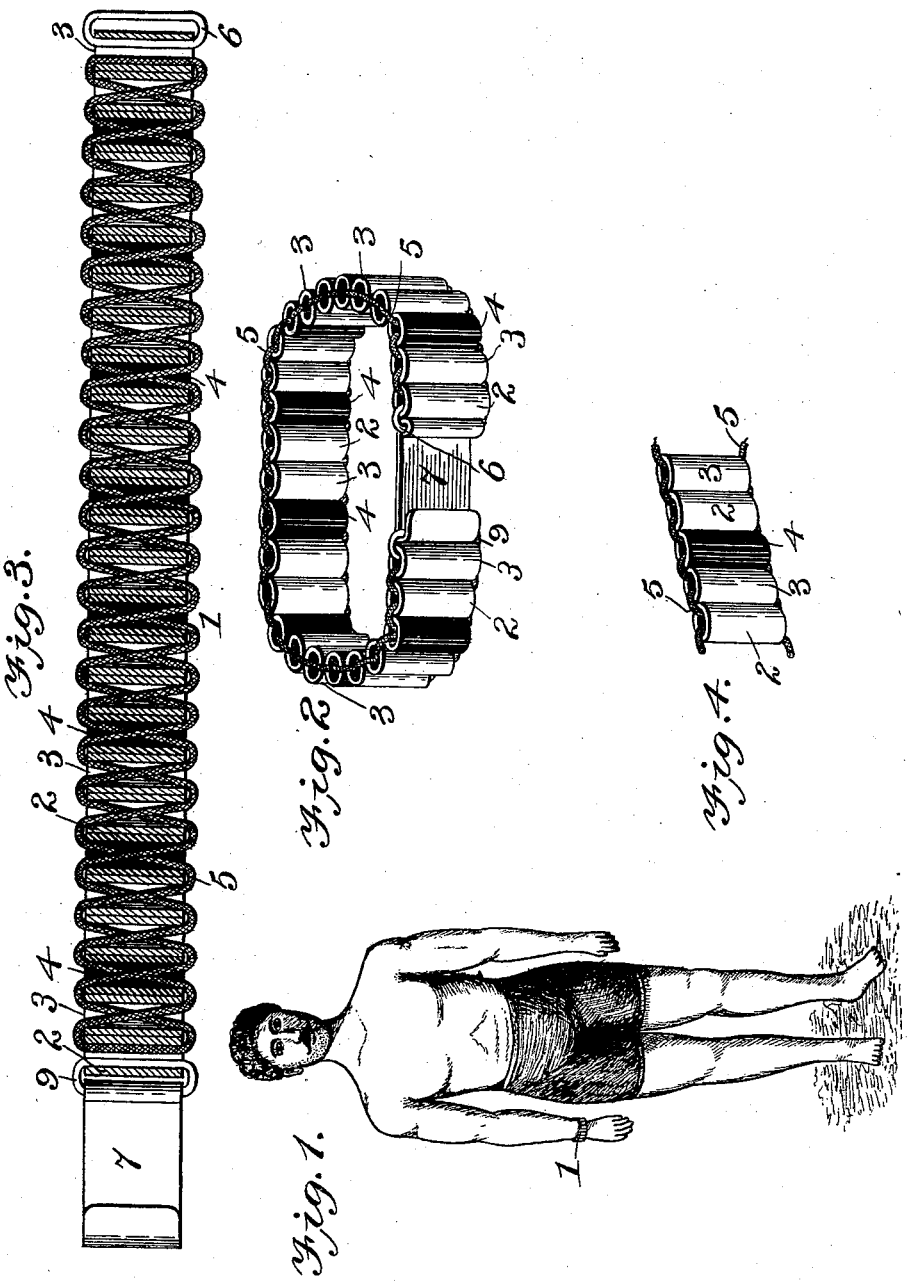

JAMES PALMER McGILL, OF CHICAGO, ILLINOIS.

ELECTRICAL BODY APPLIANCE.

SPECIFICATION forming part of Letters Patent No. 589,015, dated August 31, 1897.

Application filed February 23, 1897. Serial No. 624,683. (No model.)

*To all whom it may concern:*

Be it known that I, JAMES PALMER MCGILL, a citizen of the United States, residing at Chicago, in the county of Cook and State of Illinois, have invented a new and useful Electrical Body Appliance, of which the following is a specification.

This invention relates to electrical body appliances, and more particularly to inventions of this character known as "electric belts;" and it has for its object to provide a novel construction of electric battery, in the form of a flexible belt, adapted, preferably, to be worn at the extremities of the body for the relief of pain and nervous diseases.

To this end the main and primary object of the invention is to construct a simple and efficient electric battery requiring no acids or fluids for its excitation, but which shall produce a strong galvanic or voltaic action merely from the exciting influence of the moisture of the human body.

With these and other objects in view, as will readily appear as the nature of the invention is better understood, the same consists in the novel construction, combination, and arrangement of parts hereinafter more fully described, illustrated, and claimed.

In the drawings, Figure 1 is a general view of the appliance, showing its preferred application to the body of a person. Fig. 2 is a perspective view of the complete appliance. Fig. 3 is a longitudinal sectional view of the flexible battery-belt, showing the method of lacing the cells and insulator elements together. Fig. 4 is an enlarged detail in perspective of a portion or a few cells of the belt.

Referring to the accompanying drawings, the numeral 1 designates a flexible battery-belt comprising a plurality of separated cells, each of which cells consists of a couple or pair of tubular elements 2 and 3, respectively of different metals, and which are arranged side by side to form a galvanic or voltaic couple. The tubular elements 2 and 3 of each cell or galvanic couple of the battery-belt are preferably in the form of small cylinders open at both ends, and in order to secure the best results the positive element 2 of each cell is made of zinc and the negative element 3 of the same cell is made of copper, it of course being understood that the positive and negative elements of each cell are of the same size and shape.

To provide for the proper separation of the galvanic cells or couples of the battery-belt, there is employed a series of insulating-tubes 4 of the same size and shape as the electrode or elements of the cells and which alternate with such cells, thereby insulating and spacing apart the directly adjacent pairs of electrodes 2 and 3, forming the several cells or couples of the battery. The insulating-tubes 4 are made of rubber or other suitable material capable of effecting a proper insulation and isolation of the cells or galvanic couples in the belt, and the cell-tubes and insulating-tubes alternating therewith are flexibly joined together in a continuous series side by side by means of a flexible binding cord or wire 5, which is preferably an ordinary insulated wire which extends from end to end of the belt and is interlaced through all of the tubes or cylinders. The said flexible binding cord or wire 5 is passed back and forth through the ends of all of the tubes or cylinders 2, 3, and 4, and the separate or opposite portions of said binding cord or wire cross within each tube or cylinder of the belt, thereby providing for securely binding all of the tubes or cylinders together, while at the same time providing a flexible belt that can be readily applied to the wrist or ankle of the human body.

A negative or copper electrode 3 is at one terminal of the belt, while a positive or zinc electrode 2 is at the opposite terminal thereof, said positive or zinc electrode 2 having flexibly connected therewith by means of a loop 6 a clasp-plate 7, the free end of which plate is formed with a hook adapted to detachably engage with the loop 9, loosely connected with the terminal negative or copper electrode 3. When the battery-belt just described is placed on the wrist, ankle, or other part of the body and secured in position by the clasp connection, it will be readily understood that galvanic or voltaic action will be excited by the moisture of the body in each cell or galvanic couple, inasmuch as the positive and negative electrodes of each cell or couple are bare and have their surfaces in direct contact with the body.

From the foregoing it is thought that the construction and operation of the herein-described electrical body appliance will be readily apparent without further description, and it will be understood that various changes in the form, proportion, and the minor details of construction may be resorted to without departing from the principle or sacrificing any of the advantages of this invention.

Having thus described the invention, what is claimed, and desired to be secured by Letters Patent, is—

1. A flexible battery-belt comprising a plurality of continuously-arranged galvanic or voltaic couples, insulation between the adjacent couples, and flexible connections between the couples and insulation, substantially as described.

2. An electric battery-belt comprising a continuous series of separated galvanic or voltaic couples, insulators of the same size and form as the electrodes of the couples and arranged between and alternating with the adjacent couples, and flexible connections for joining the couples and the insulators in a continuous series, substantially as set forth.

3. An electric belt comprising a plurality of separated cells, each consisting of a pair of tubular bared electrodes or elements arranged side by side to form a galvanic couple, and insulating-tubes alternating with said cells and flexibly joined therewith, substantially as set forth.

4. An electric belt comprising a plurality of separated cells, each consisting of a pair of bare copper and zinc tubes arranged side by side to form a galvanic couple, insulating-tubes of the same size and shape as the cell-tubes and alternating with the pairs of such cell-tubes, a flexible binding cord or wire laced back and forth through all of the tubes to flexibly connect the same in a continuous series, and a detachable clasp connection between the terminal tubes of the belt, substantially as set forth.

5. An electric belt comprising a plurality of cells insulated from each other and each consisting of a pair of tubular bared positive and negative elements, and a flexible binding cord or wire laced through said tubes to flexibly connect the same together, substantially as set forth.

In testimony that I claim the foregoing as my own I have hereto affixed my signature in the presence of two witnesses.

JAMES PALMER McGILL.

Witnesses:
    FRANK L. TYRRELL,
    R. B. SHEARER.